Patented Oct. 21, 1941

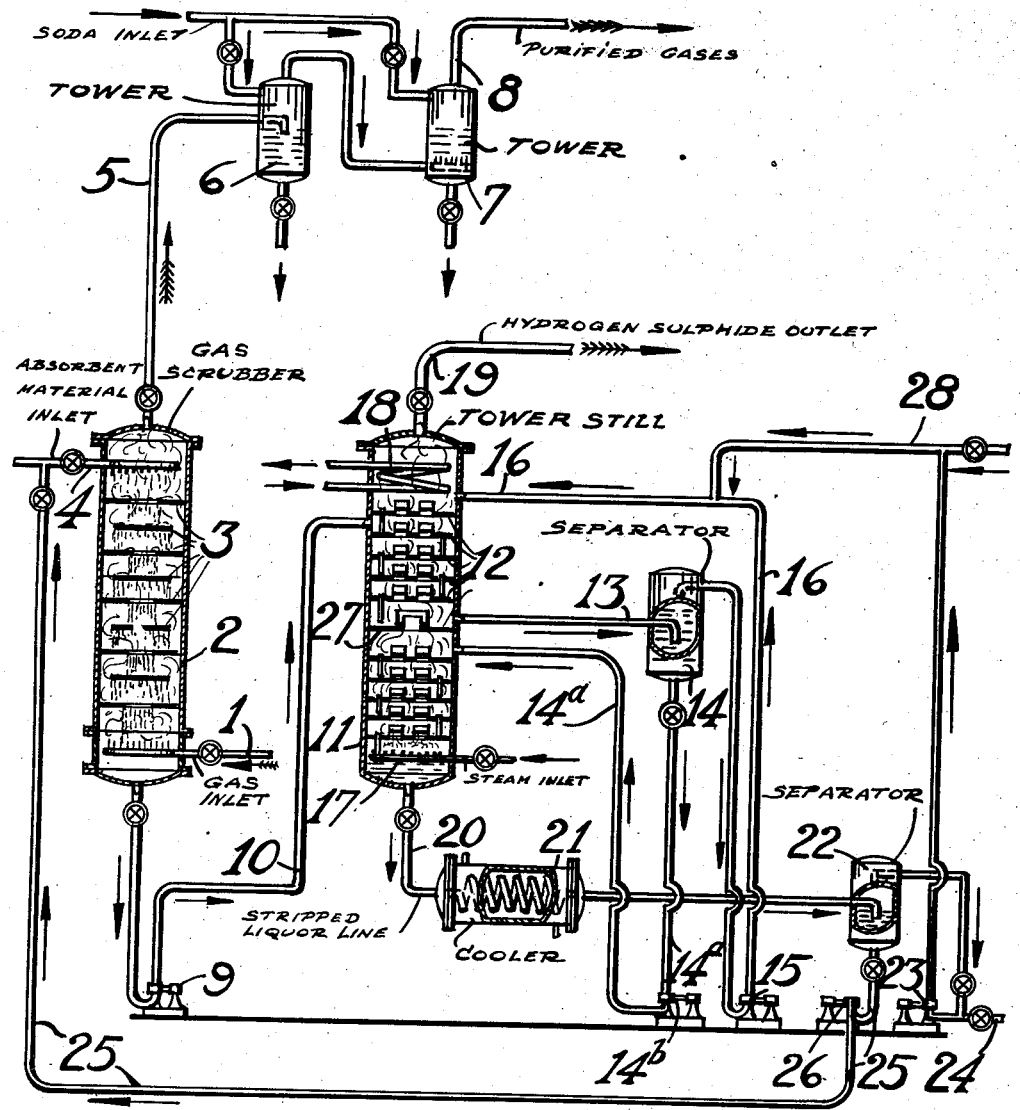

2,259,901

UNITED STATES PATENT OFFICE 2,259,901

METHOD FOR PURIFYING GAS MIXTURES

George L. Matheson, Union, N. J., assignor to Standard Oil Development Company, a corporation of Delaware Application April 7, 1938, Serial No. 200,599

4 Claims. (Cl. 23—2)

The present invention relates to the purification of gas mixtures and more specifically to a method for removing weakly acid constituents from fuel and other gases. This invention will be fully understood from the following description and the drawing which illustrates one means for carrying out the process.

The drawing is a semi-diagrammatic sketch in elevation of an apparatus arranged for the carrying out of the present process showing the absorption of the weakly acid constituents from the gas mixture and the recovery of the absorption menstruum.

In the following description the process as adapted to the removal of hydrogen sulphide from fuel gases by means of a concentrated solution of sodium dichlorphenate is given for purpose of illustration. It will be understood that other weakly acid gases may be removed from other gas mixtures by this process and for this purpose other absorption media may be substituted for sodium dichlorphenate as will be made clear below.

The gas mixture is supplied by gas main 1 to a scrubbing means 2, which is conveniently in the form of a tower fitted with contact means 3. The absorbent material is forced into the top of the tower by means of a line 4. The tower may be operated at any convenient pressure, for example, at atmospheric pressure or at higher pressures if available, but it will be understood that the process can work at reduced pressures as well. The gases leave the tower by a line 5, and may be passed through a series of short towers or bottles supplied with caustic soda and designated by numerals 6 and 7. These are not necessary to the process but are desirable in order to remove all trace of the gas impurities and of sodium dichlorphenate which may be carried over from the tower, especially if the rate of flow of gas is high. The purified gases are now conducted by the main 8 to the point of utilization. As the solution of the sodium dichlorophenate or its equivalent passes downwardly through the tower 2 in countercurrent contact with the impure gas, the weak acid constituents of the gas are absorbed and replace dichlorphenate from its salt. The dichlorphenate is precipitated in a fluid form and the two immiscible liquids, the aqueous and the dichlorphenate, flow together through the tower and are conducted by pump 9 and pipe 10 to the recovery system.

Pipe 10 discharges into the column of tower still 11 which may be fitted with plates 12, with the ordinary means for allowing liquid to pass downwardly and vapor upwardly through the tower. The tower may be conveniently divided into two portions by a plate 27 which is similar to the other plates in that it allows vapor from the lower part of the tower to rise but is not fitted with down flow pipes. The mixed liquor is withdrawn from plate 27 by line 13 as a side stream and is collected and allowed to separate in the chamber 14. The upper or dichlorphenate liquor is returned to the top of the tower by pump 15 and pipe 16. The lower or aqueous layer is passed into the tower just below plate 27. The lower part of the still is heated as, for example, by a closed steam coil 17. A refluxing coil 18 may be placed in the upper end of the tower 11 and a cooling medium such as cold water may be passed through the coil to condense and return to the tower all the dichlorphenate, and the greater part of the water which may be vaporized during the heating operation. It is also of advantage to add sodium dichlorphenate by means of recirculating pump 23 through pipe 28, in the form of a strong, aqueous solution or mixture which flows with ease through the pipe. Pipe 19 carries off the hydrogen sulphide to be burned or utilized as desired.

The stripped liquor leaving the still by means of pipe 20 passes through cooler 21 into a separator 22. This separator is not required if a tower fitted with a plate 27 as shown is used. It is especially desirable, however, where an ordinary tower is provided without a plate such as 27 and the settling drum 14. Make-up sodium dichlorphenate may be added by pipe 24. Theoretically, there should be no loss of sodium dichlorphenate since the sodium dichlorphenate is regenerated during the process, but in practice it is found that small losses occur probably due to absorption of strong acid gases such as $SO_3$, and that this is the most convenient place for making up these losses. An aqueous solution of the alkali salt is drawn off from the lower part of the separator 22 and is returned to tower 1 by line 25 and pump 26.

In the operation of this process, it is found that the chlorinated phenolic salts of strongly basic metals, such as alkali metals which form water soluble sulfides, are highly desirable absorption means for weakly acid constituents, such as hydrogen sulfide, carbon dioxide, hydrocyanic acid and sulfur dioxide or the like which occur in fuel and other industrial gas mixtures. Strong acid gases, such as $SO_3$ are dissolved but cannot be expelled by heating and this process is, therefore, not adapted to the removal of such gases. Other derivatives of phenol were found to be very effective as absorption means, particularly substituted phenols in which a hydrogen had been substituted by a negative group with an increase in acidity of the hydrogen of the hydroxyl group of the phenols. The negative groups that may be used are nitros, hydroxyls, halogens, sulfides, sulfonates, etc. Halogenated alkylated substitution products of phenol may likewise be used with advantage as well as other alkylated substitution products of phenol in which one of the negative groups had been substituted in place of a hydrogen. Mixtures of these compounds may be used alone or in admixture with other absorbents, such as phenols, triethanolamine, etc.

In the recovery step of this process, it has been found that the application of heat causes the weakly acid gas constituents to be expelled from the solution and the sodium dichlorphenate or its equivalent non-volatile acids, which are continuously present, gradually pass into solution in the aqueous liquor during the heating step. The heating may be carried out as shown in the drawing under rectifying or refluxing conditions, and in this case it is desirable to maintain the still somewhat above 100° C. that is to say, at the boiling point of the solution which is usually from 105° to about 115° C. The upper end of the column is held at a temperature of about 90° F. or even lower so that substantially no sodium dichlorphenate is removed and the dry gas leaves the tower without removing a substantial amount of water. It is highly desirable to provide an excess of the sodium dichlorphenate in the upper part of the column and this may be done by the tower as shown in the drawing with the plate 27 and the means for using and separating the two layers or it can be accomplished merely by adding an excess of sodium dichlorphenate by pipe 24 which is subsequently separated and returned by separator 22. It will be understood that any equivalent form of apparatus may be used instead of the apparatus shown.

It is not necessary to conduct the stripping operation under rectifying conditions, and if desired it can be done by simply heating in an ordinary still to boiling point but under these conditions part of the water and some of the phenol will be carried over and must be condensed and recovered. Open steam may be injected into the base of the tower to assist stripping but care should be taken not to unduly dilute the scrubbing liquor. Inert gas can be used in place of steam if it is not desirable to recover the acid gas in concentrated form.

This process may be used for a great many different weakly acid gas constituents among which carbon dioxide, hydrogen sulphide, sulphur dioxide and hydrocyanic acid are the most common, but other gases of substantially the same acid strength may be recovered as will be understood. In the process it is preferred to use a relatively strong aqueous solution of the sodium, or potassium dichlorphenate or its equivalent. When sodium dichlorphenate is first used it dissolves a somewhat greater proportion of hydrogen sulphide than can be subsequently evolved simply by heating, but the fact that a certain amount of hydrogen sulphide is permanently bound in the solution presents no difficulty.

Batch heat of desorption of hydrogen sulphide from various absorbents is shown herebelow.

All the absorbents are 3.33 molar in NaOH and 4.44 molar in acid.

BASIS: 1 GALLON OF ABSORBENT

*All solutions saturated with 100% $H_2S$ at 75° F. (23.9° C.)*

| Triethanolamine 50% by weight | | Sodium phenate | | Crude sodium phenate | |
|---|---|---|---|---|---|
| Total cu. ft. $H_2S$ at S. C. desorbed | Total heat for desorption B. t. u. | Total cu. ft. $H_2S$ at S. C. desorbed | Total heat for desorption B. t. u. | Total cu. ft. $H_2S$ at S. C. desorbed | Total heat for desorption B. t. u. |
| 0.52 | 130 | 1.31 | 1580 | 0.65 | 836 |
| 1.04 | 200 | 2.55 | 2180 | 1.29 | 1000 |
| 1.50 | 253 | 3.75 | 2650 | 1.90 | 1240 |
| 2.00 | 352 | 4.95 | 3330 | 2.50 | 1480 |
| 2.50 | 440 | 6.15 | 4180 | 3.10 | 1750 |
| 3.00 | 535 | 7.35 | 5950 | 3.70 | 2030 |
| 3.50 | 635 | 8.50 | 9260 | 4.35 | 2300 |
| 4.00 | 755 | | | 4.95 | 2610 |
| 4.48 | 900 | | | 5.55 | 3080 |
| 4.95 | 1060 | | | 6.15 | 3720 |
| 5.40 | 1230 | | | 6.75 | 4570 |
| 5.90 | 1460 | | | 7.35 | 5790 |
| 6.35 | 1750 | | | | |
| 6.65 | 2640 | | | | |

| Sodium monochlorphenate | | Sodium dichlorphenate | | Crude sodium chlorinated phenate | |
|---|---|---|---|---|---|
| Total cu. ft. $H_2S$ at S. C. desorbed | Total heat for desorption B. t. u. | Total cu. ft. $H_2S$ at S. C. desorbed | Total heat for desorption B. t. u. | Total cu. ft. $H_2S$ at S. C. desorbed | Total heat for desorption B. t. u. |
| 1.16 | 1190 | 0.53 | 323 | 0.59 | 97 |
| 2.38 | 1880 | 1.09 | 492 | 1.15 | 161 |
| 3.73 | 2420 | 1.67 | 564 | 1.80 | 225 |
| 4.85 | 2750 | 2.29 | 629 | 2.42 | 281 |
| 6.00 | 3430 | 2.89 | 678 | 3.03 | 367 |
| 7.20 | 4225 | 3.46 | 741 | 3.64 | 471 |
| 8.40 | 5860 | 4.04 | 843 | 4.24 | 576 |
| 9.45 | 7280 | 4.61 | 1000 | 4.86 | 691 |
| | | 5.19 | 1110 | 5.45 | 808 |
| | | 5.80 | 1280 | 6.05 | 953 |
| | | 6.45 | 1520 | 6.60 | 1190 |
| | | 7.00 | 1790 | 7.20 | 1500 |
| | | 7.45 | 2280 | 7.75 | 2030 |
| | | | | 7.85 | 2330 |

This invention is not to be limited to any theory of the particular chemical reactions which may be supposed to occur during the absorption, or recovery steps, nor to the removal of any particular weakly acid gas constituent, nor, indeed, to any particular absorption means, but only to the claims in which it is wished to cover this invention as fully as is permissible by the prior art.

I claim:

1. A process of removing hydrogen sulfide, carbon dioxide and the like from a gaseous mixture containing the same which comprises scrubbing the gas with an aqueous solution of an alkali-forming metal and a dichlorphenol, the phenol being in excess of the stoichemical equivalent of the alkali to absorb hydrogen sulfide, carbon dioxide and the like from the said mixture, removing the solution from the gas and blowing the solution with steam to drive off the hydrogen sulfide, carbon dioxide and the like and recirculating the solution for further absorption.

2. A process for removing hydrogen sulfide, carbon dioxide and the like from a gas mixture containing the same which comprises washing the gas mixture in the absorption state with a solution of an alkali salt of dichlorphenate and free dichlorphenol for the removal of hydrogen sulfide, carbon dioxide and the like, removing the solution together with the thereby liberated chlorinated phenol and heating while blowing with steam to drive off hydrogen sulfide, carbon dioxide and the like therefrom and regenerating the absorbent properties of the solution.

3. A process for removing carbon dioxide from gas mixtures containing the same according to claim 2 in which the alkali salt of dichlor phenate is sodium dichlor phenate.

4. A process for removing carbon dioxide and the like containing the same according to claim 2 in which the alkali salt of dichlor phenate is potassium dichlor phenate.

GEORGE L. MATHESON.